Oct. 15, 1968
E. A. DOW
3,405,732
REPLACEABLE VALVE AND VALVE SEAT UNITS
FOR CONTROL VALVES
Filed Oct. 22, 1965
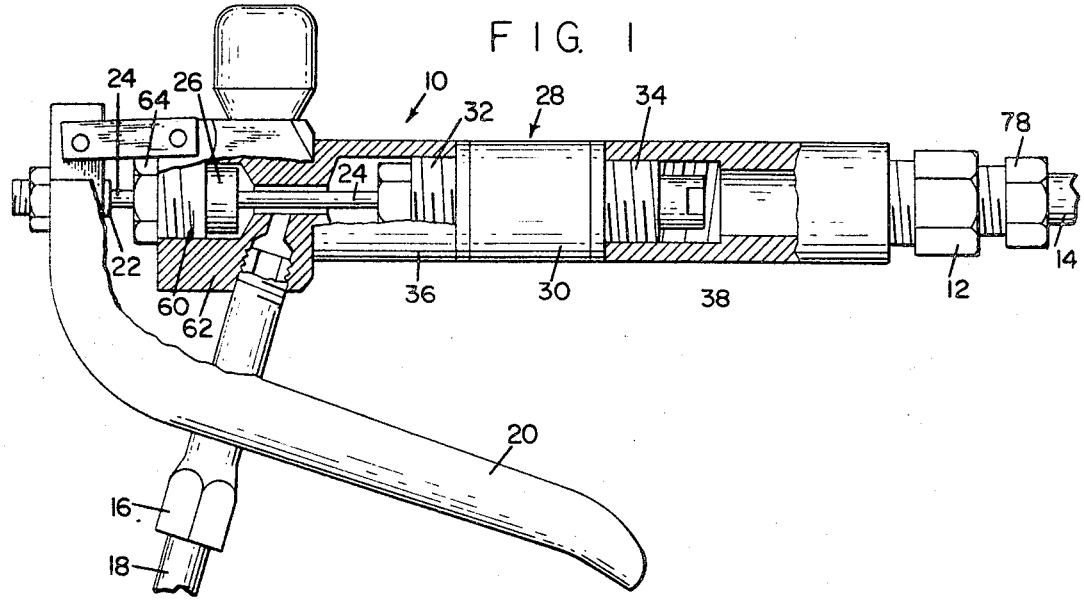
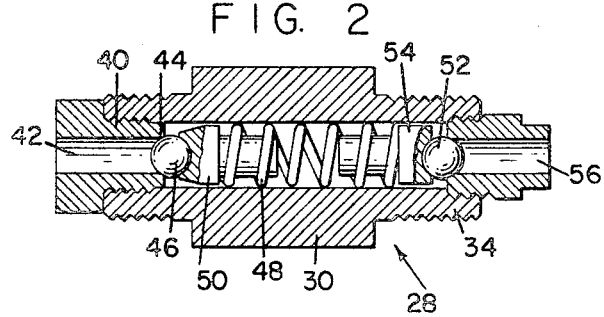
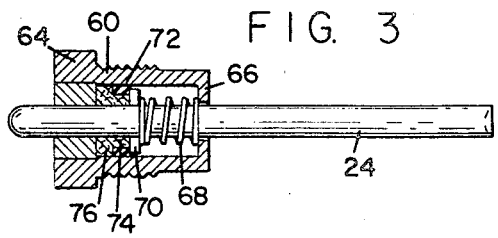
INVENTOR
EDMUND A. DOW
BY *Charles R. Fay,*
ATTORNEY

United States Patent Office 3,405,732
Patented Oct. 15, 1968

3,405,732
REPLACEABLE VALVE AND VALVE SEAT UNITS
FOR CONTROL VALVES
Edmund A. Dow, 18 Indian Lake Parkway,
Worcester, Mass. 01608
Filed Oct. 22, 1965, Ser. No. 501,039
4 Claims. (Cl. 137—614.19)

ABSTRACT OF THE DISCLOSURE

A gun type lubricating device having a two-part handle with a combined valve and valve seat assembly which is removable as a unit from between two parts of the handle and itself forms a part of the handle separating the aforesaid two parts of the handle.

This invention relates to removable and replaceable assembled units for the valve and the valve seat for a control valve device for pressure lubrication. In these devices of well known types, there have been in the past the problem of wear as to the valves and valve seats, and in the prior art when this has happened the entire control valve (grease gun) must be returned to the factory so that it can be repaired. This of course takes a good deal of time, particularly when the user of the grease gun is a relatively small operator and may have only one or two such devices available, and it is the general purpose of the present invention to provide the operator with means to service his own lubricator simply by unscrewing a part of the handle portion, removing the novel valve and valve seat unit which has become worn, and replacing it by another one of the novel valve and valve seat unit assemblies.

This repair operation is extremely simple involving merely the backing off of a part of the handle of the grease gun, backing off the valve unit which has become worn, threading in a new unit and then threading on the remainder of the handle.

This invention also contemplates the provision of a similar removable and replaceable assembly unit for a seal for the stem of the grease gun which actuates the valve, as these seals tend to wear and leak and therefore must be replaced under the same disadvantages as described above with relation to the valve and valve seat units.

Other objects and advantages of the invention will appear hereinafter.

Reference is to be had to the accompanying drawings in which:

FIG. 1 is a view in elevation with parts broken away and in section illustrating the invention;

FIG. 2 is a longitudinal section on an enlarged scale through one of the new removable and replaceable valve and valve seat assembly units, and FIG. 3 is a longitudinal sectional view through one of the novel seal assemblies for the actuating stem for the valve.

The main parts of the control valve device, or grease gun, which go to form the present invention include a handle portion generally indicated at 10, an intake fitting or the like 12 which is connected to a source of grease or the like at 14, an outlet fitting 16 connected to a pipe 18 for the pressure application of the grease to the point desired. There is also a finger-operated pivoted lever 20 and when the handle 10 is grasped and the pivoted lever 20 moved into close association therewith, the grease which is under pressure at its source will flow through the handle, through the fitting 16, etc.

When the lever 20 is moved in a counterclockwise direction in FIG. 1, i.e., toward handle 10, an adjustable abutment member 22 thereon impinges upon the left-hand end of a stem or rod 24 causing it to move to the right through a unitary seal assembly unit 26 to impinge upon and open a valve to be described in the valve and valve seat assembly unit 28, thus temporarily opening the way for the grease to flow.

The valve and valve seat unitary assembly 28 is best shown in FIG. 2 and comprises a barrel or thimble 30 having reduced screw-threaded end nipples 32 and 34. The screw threads on the end at 32 unite the barrel 30 with respect to the portion 36 of the handle and by turning off members 28 and 34 for instance as a unit, the handle comes apart with the stem 24 being left behind and the parts 28 and 34 being removed. Of course the screw-threaded element 34 threads into interior threads on a handle element 38 which is at the opposite side of the barrel 30 from that at 36 and it will be seen that the element 38 can be screwed off from the threads 34 and the unit 28 can then be unscrewed from the unit 36 so that the valve assembly 28 can be completely removed and a new one set in position even without the use of any tools except possibly for a wrench.

The nipple 32 receives therein a longitudinally drilled threaded member 40 having the passage 42 therein which receives stem 24. There is a valve seat at the inner end of the element 40 indicated at 44 and a ball 46 opens or closes this seat being normally held in closed condition under pressure of spring 48 working on a spring follower 50 bearing on the ball.

It will be seen that when the stem 24 moves to the right, see FIG. 2, it will impinge upon the ball 46, dislodging it to the right and opening the port in the valve seat 44 to the passage of grease between the walls of the passage 42 and the rod.

At the other end of the unit there is a check valve which comprises a ball 52 under pressure from the spring 48 and a follower 54, similar to that at 50. The grease being under pressure can always enter through the passage 56 in the fitting past the ball 52 but the check valve 52 prevents the reverse motion of the grease.

The sealing unit is best shown in FIG. 3 and it comprises a threaded fitting 60 which threads into the forward end of the body portion 62 of the handle member assembly and is easily applied or removed by means of the nut 64. It terminates at the right-hand end in an abutment 66 against which bears a spring 68, this spring bearing at its opposite end against a washer 70 bearing on an annular rubber seal 72. This seal is mounted on the longitudinally extending annular reduced stem 74 of a leather washer member 76. It will be seen that the spring normally urges the parts to a sealed condition but does not prevent the rod 24 from being slidable therein.

Were the rubber seal 72 to be used alone without the leather support therefore, it would very soon become ineffective because it would deteriorate under contact with the grease, but being mounted on the leather nipple 74 of the leather washer 76, it tends to squeeze the leather part 74 to the stem 24 to form a seal.

It has been explained above how the valve and valve seat assembly is quickly and easily changed in case it should start to fail. The seal assembly is changed just as easily and quickly simply by opening the lever 20 and turning off the nut 64, which brings with it the entire assembly shown in FIG. 3, so that a new assembly including a new rod 24 can be put back into the grease gun in a matter of a few seconds.

If desired, the fitting 12 may have a smaller fitting for it as at 78 so that two sizes of hoses at 14 can be accommodated for instance an eighth inch and a quarter inch; and also if desired the fitting at 12 may be provided with a strainer.

It will be seen that it is a very simple thing for a grease gun operator to renew his valve and valve seat assembly in case it should start to malfunction, and the same is true as to the seal assembly in case it should start to leak, obviating the necessity of sending the tool back to the factory or to a repair shop for the replacement of the parts, and thus allowing the operator to finish whatever job he is working on simply by changing the parts in a matter of seconds.

Having thus described my invention and the advantages thereof, I do not wish to be limited to the details herein disclosed, otherwise than as set forth in the claims, but what I claim is:

1. A lubrication device having a valve and valve seat assembly removable and replaceable as a unit, a control for the device including a two-part handle, a passage therethrough for the grease, said valve and valve seat assembly comprising a hollow open-ended barrel, means at one end thereof for temporarily attaching the same to one part of the handle, means at the other end of the barrel for attachment to the other part of the handle, the barrel spacing the handle parts and forming a part thereof, a valve in the barrel, a stem and means to operate the stem on one of the handle parts, means in said barrel receiving said stem for operation of the valve thereby, the means for securing the valve and valve seat assembly to said handle being constructed and arranged to receive said stem in the correct position when the assembly is removed and a new one applied.

2. The device of claim 1 including a removable seal unit for said stem, wherein said seal unit comprises a removable fitting, means extending axially therethrough slidably receiving said stem, an annular rubber seal member disposed about said stem, and a fibrous member between the stem and the rubber seal, said rubber seal tending to squeeze said fibrous member tightly about said stem sealing the same against escape of lubricant.

3. The device of claim 2 wherein said fibrous member includes an annular reduced portion extending axially thereof, the rubber seal member being mounted on the reduced portion.

4. The device of claim 2 wherein said fibrous member includes an annular reduced portion extending axially thereof, the rubber seal member being mounted on the reduced portion, a washer and a spring engaged with said washer tending to move the washer, rubber seal and fibrous member in a predetermined direction within said fitting.

References Cited
UNITED STATES PATENTS

| | | | |
|---|---|---|---|
| 1,733,441 | 10/1929 | Barks | 251—239 |
| 2,653,624 | 9/1953 | Klessig | 137—512.5 |
| 2,754,839 | 7/1956 | Brugge | 137—454.2 |

WILLIAM F. O'DEA, *Primary Examiner.*

H. COHN, *Assistant Examiner.*